United States Patent
Kobayashi et al.

(10) Patent No.: US 9,083,944 B2
(45) Date of Patent: Jul. 14, 2015

(54) ENCODING APPARATUS, DECODING APPARATUS, ENCODING METHOD, AND DECODING METHOD

(75) Inventors: Shunsuke Kobayashi, Fukuoka (JP); Akira Nakagawa, Kawasaki (JP); Lalitha Bhavani Susarla, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 926 days.

(21) Appl. No.: 12/292,690

(22) Filed: Nov. 24, 2008

(65) Prior Publication Data

US 2009/0232199 A1    Sep. 17, 2009

(30) Foreign Application Priority Data

Mar. 17, 2008  (JP) ................................ 2008-068527
Apr. 17, 2008  (JP) ................................ 2008-108240

(51) Int. Cl.
*H04N 7/12*     (2006.01)
*H04N 19/00*    (2014.01)
*H04N 19/46*    (2014.01)
*H04N 19/89*    (2014.01)
(Continued)

(52) U.S. Cl.
CPC .............. *H04N 19/00* (2013.01); *H04N 19/46* (2014.11); *H04N 19/68* (2014.11); *H04N 19/89* (2014.11); *H04N 19/70* (2014.11)

(58) Field of Classification Search
CPC ....... H04N 19/00; H04N 19/68; H04N 19/89; H04N 19/46; H04N 19/70
USPC ................ 375/240.01, 240.12; 370/386, 473; 365/222
IPC ................................... H04N 370/386
See application file for complete search history.

(56) References Cited

U.S. PATENT DOCUMENTS 8,396,082 B2 *  3/2013  Hannuksela et al. ......... 370/473
2004/0161033 A1  8/2004  Notoya et al.
(Continued)

FOREIGN PATENT DOCUMENTS

JP    2004-274732 A    9/2004

OTHER PUBLICATIONS

JVT; "Editor's Proposed Draft Text Modifications for Joint Video Specification (ITU-T Rec. H.264 ISO/IEC 14496-10 AVC), Geneva modifications draft 37" JVT-E146d37; Oct. 9, 2002; pp. 60-62.
(Continued)

*Primary Examiner* — Y Lee
*Assistant Examiner* — Richard Carter
(74) *Attorney, Agent, or Firm* — Fujitsu Patent Center (57) ABSTRACT

An encoding apparatus encodes image data using a picture order count (POC) that indicates a display order of a picture. The encoding apparatus includes a remainder calculating unit that calculates a remainder by dividing an absolute frame number counted from an instantaneous decoding refresh (IDR) picture by a divisor which is a number of reference frames in one POC cycle, and a remainder code converting unit that coverts the remainder calculated by the remainder calculating unit into a code. A decoding apparatus decodes image data using the POC. The decoding apparatus includes a remainder extracting unit that, when random access decoding is performed, extracts a remainder by decoding a remainder code added to a picture at a random decoding start position, and an initializing unit that initializes an input value of a decoding process for the POC, by using the remainder extracted by the remainder extracting unit.

13 Claims, 10 Drawing Sheets

(51) Int. Cl.
*H04N 19/68* (2014.01)
*H04N 19/70* (2014.01)

(56) References Cited

U.S. PATENT DOCUMENTS

| | | | |
|---|---|---|---|
| 2005/0099869 A1* | 5/2005 | Crinon et al. | 365/222 |
| 2006/0114988 A1* | 6/2006 | Gomila et al. | 375/240.01 |
| 2008/0170564 A1* | 7/2008 | Shi et al. | 370/386 |
| 2008/0267287 A1* | 10/2008 | Hannuksela | 375/240.12 |
| 2009/0232199 A1* | 9/2009 | Kobayashi et al. | 375/240.01 |
| 2010/0086036 A1* | 4/2010 | Jeon et al. | 375/240.12 |

OTHER PUBLICATIONS

Wang et al, "POC Recovery in Random Access Pint SEI" Joint Video Team (JVT) of ISO/IEC MPEG & ITU-T VCEG (ISO/IEC JTC1/SC29/WG11 and ITU-T SG16 Q6), No. JVT-F050, Dec. 13, 2002 (Previously Cited).
"Text of ISO/IEC 14496-10: 200X/FDIS Advanced Video Coding (4$^{th}$ Edition)" 81. MPEG Meeting, Feb. 6, 2007-6-62007, Lausanne; (Motion Picture Expert Group) Oct. 28, 2007 (Previously Cited).
European Office Action for corresponding European Application No. 08 020 620.4-2223; dated Jun. 7, 2010.
Ye-Kui Wang et al, "POC Recovery in Random Access Point SEI Message", Feb. 27, 2008, pp. 1-5.
Wang et al, "POC Recovery in Random Access Pint SEI" Joint Video Team (JVT) of ISO/IEC MPEG & ITU-T VCEG (ISO/IEC JTC1/SC29/WG11 and ITU-T SG16 Q6), No. JVT-F050, Dec. 13, 2002.
"Text of ISO/IEC 14496-10: 200X/FDIS Advanced Video Coding (4$^{th}$ Edition)" 81. MPEG Meeting, Feb. 6, 2007-6-62007, Lausanne; (Motion Picture Expert Group) Oct. 28, 2007.
Kazui K. et al., "Modification of decoding process for POC type 1", 27. JVT Meeting Jun. 4, 2008-Oct. 4, 2008; Geneva, (Joint Video Team of ISO/IEC JTC1/SC29/WG11/and ITU-T SG.16), Apr. 24, 2008, Solution 3, p. 6.
Eifrig, "POC Wrap, RAP, and Missing Frames and Fields", Joint Video Team (JVT) of ISO/IEC MPEG & ITU-T VCEG (ISO/IEC JTC1/SC29/WG11 and ITU-T SG16 Q6), No. JVT-F098-L, Dec. 13, 2002.
Japanese Office Action mailed on Nov. 22, 2011 for corresponding Japanese Application No. 2008-108240, with Partial English-language Translation.

\* cited by examiner

| recovery_point (payloadSize) { | C | DESCRIPTOR |
|---|---|---|
| recovery_frame_cnt | 5 | ue(v) |
| exact_match_flag | 5 | u(1) |
| broken_link_flag | 5 | u(1) |
| changing_slice_group_flag | 5 | u(2) |
| if (pic_order_cnt_type = = 1) { | | |
| initialFrameNumInPicOrderCntCycle | 5 | ue(v) |
| } | | |
| } | | |

1. The variable FrameNumOffset is derived as follows:
if( nal_unit_type = = 5 )
FrameNumOffset = 0
else if( prevFrameNum > frame_num )  (8-6)
FrameNumOffset = prevFrameNumOffset + MaxFrameNum
else
FrameNumOffset = prevFrameNumOffset 2. The variable absFrameNum is derived as follows:
if( num_ref_frames_in_pic_order_cnt_cycle != 0 )
absFrameNum = FrameNumOffset + frame_num
else  (8-7)
absFrameNum = 0
if( nal_ref_idc = = 0 && absFrameNum > 0 )
absFrameNum = absFrameNum − 1

3. When absFrameNum > 0, picOrderCntCycleCnt and frameNumInPicOrderCntCycle are derived
as follows: if( absFrameNum > 0 ) {
picOrderCntCycleCnt = ( absFrameNum − 1 ) / num_ref_frames_in_pic_order_cnt_cycle
frameNumInPicOrderCntCycle = ( absFrameNum − 1 ) % num_ref_frames_in_pic_order_cnt_cycle
}  (8-8)

4. The variable expectedDeltaPerPicOrderCntCycle is derived as follows:
expectedDeltaPerPicOrderCntCycle = 0
for( i = 0; i < num_ref_frames_in_pic_order_cnt_cycle; i++ )
expectedDeltaPerPicOrderCntCycle += offset_for_ref_frame[ i ]  (8-9)

5. The variable expectedPicOrderCnt is derived as follows:
if( absFrameNum > 0 ){
expectedPicOrderCnt = picOrderCntCycleCnt * expectedDeltaPerPicOrderCntCycle
for( i = 0; i <= frameNumInPicOrderCntCycle; i++ )
expectedPicOrderCnt = expectedPicOrderCnt + offset_for_ref_frame[ i ]
} else
expectedPicOrderCnt = 0
if( nal_ref_idc = = 0 )  (8-10)
expectedPicOrderCnt = expectedPicOrderCnt + offset_for_non_ref_pic 6. The variables TopFieldOrderCnt or BottomFieldOrderCnt are derived as follows:
if( !field_pic_flag ) {
TopFieldOrderCnt = expectedPicOrderCnt + delta_pic_order_cnt[ 0 ]
BottomFieldOrderCnt = TopFieldOrderCnt +
offset_for_top_to_bottom_field + delta_pic_order_cnt[ 1 ]  (8-11)
} else if( !bottom_field_flag )
TopFieldOrderCnt = expectedPicOrderCnt + delta_pic_order_cnt[ 0 ]
else
BottomFieldOrderCnt = expectedPicOrderCnt + offset_for_top_to_bottom_field + delta_pic_order_cnt[ 0 ]

US 9,083,944 B2

ENCODING APPARATUS, DECODING APPARATUS, ENCODING METHOD, AND DECODING METHOD

CROSS-REFERENCE TO RELATED APPLICATION

This application is based upon and claims the benefit of priority of the prior Japanese Patent Application No. 2008-068527, filed on Mar. 17, 2008 and No. 2008-108240, filed on Apr. 17, 2008, the entire contents of which are incorporated herein by reference.

FIELD

The embodiments discussed herein are directed to an encoding apparatus, a decoding apparatus, an encoding method, and a decoding method that encode or decode image data, using a picture order count (POC) that indicates display order of pictures.

BACKGROUND

H.264/MPEG-4 AVC defines a POC that indicates a display order of pictures at the side of a decoding apparatus. Three types of methods such as POC type 0, POC type 1, and POC type 2 are known as encoding methods for the POC. A decoding process for the POC encoded by POC type 1 is defined in "8.2.1.2" in the H.264/MPEG-4 AVC as illustrated in FIG. 12.

According to "8.2.1.2" of H.264/MPEG-4 AVC, the POC of POC type 1 is decoded by initializing FrameNumOffset to 0, as specified while decoding an instantaneous decoding refresh (IDR) picture (picture in which nal_unit_type is equal to 5) in an encoded stream (see "8-6" in FIG. 12). Subsequently, the POC of POC type 1 is decoded by using the information that can be obtained from the encoded stream.

However, during random access (when encoded stream is decoded from the middle), decoding does not always start from the IDR picture. Accordingly, the FrameNumOffset, which is an input value for the decoding process of the POC of POC type 1, may not be initialized, and the POC value may not match with the display order of pictures, even if the POC of POC type 1 is decoded based on the process.

To decode the POC encoded by POC type 1 during random access so as to obtain decoded POC correctly matching with the display order of pictures, a technology that encodes and transmits information that allows the absolute value of the POC to be decoded, as the information required to correctly initialize the FrameNumOffset, at the side of an encoding apparatus is known (see "JVT-F050 POC Recovery in Random Access Point SEI Message", [online], searched on Feb. 27, 2008, Internet <URL:http//ftp3.itu.ch/av-arch/jvt-site/2002_12_Awaji/JVT-F050.doc>).

Further, it is known to encode and transmit a value obtained by dividing FrameNumOffset by MaxFrameNum as the information required for correctly initializing the FrameNumOffset.

However, when the value obtained by dividing the FrameNumOffset by the MaxFrameNum is encoded and transmitted as the information required for correctly initializing the FrameNumOffset, the amount of information required for encoding becomes too large.

SUMMARY

It is an object of the present invention to at least partially solve the problems in the conventional technology.

According to one aspect of an embodiment, an encoding apparatus encodes image data using a picture order count (POC) that indicates a display order of a picture, and the encoding apparatus includes a remainder calculating unit that calculates a remainder by dividing an absolute frame number counted from an instantaneous decoding refresh (IDR) picture by a divisor which is a number of reference frames in one POC cycle, and a remainder code converting unit that coverts the remainder calculated by the remainder calculating unit into a code.

According to another aspect of an embodiment of the present invention, a decoding apparatus decodes image data using a POC that indicates a display order of a picture, and the decoding apparatus includes a remainder extracting unit that, when random access decoding is performed, extracts a remainder by decoding a remainder code added to a picture at a random decoding start position, and an initializing unit that initializes an input value of a decoding process for the POC, by using the remainder extracted by the remainder extracting unit.

According to still another aspect of an embodiment of the present invention, an encoding method for encoding image data using a POC that indicates a display order of a picture includes calculating a remainder by dividing an absolute frame number counted from an IDR picture by a divisor which is a number of reference frames in one POC cycle, and converting the remainder calculated in the calculating into a code.

According to still another aspect of an embodiment of the present invention, a decoding method for decoding image data using a POC that indicates a display order of a picture includes extracting, when random access decoding is performed, a remainder by decoding a remainder code added to a picture at a random decoding start position, and initializing an input value of a decoding process for the POC, by using the remainder extracted by the extracting.

According to still another aspect of an embodiment, a computer program product causes a computer to perform the method according to an embodiment of the present invention.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 12 illustrates a decoding process specified in H.264/MPEG-4 AVC.

DESCRIPTION OF EMBODIMENTS

Exemplary embodiments of an encoding apparatus, a decoding apparatus, an encoding method, and a decoding method according to the present invention are described below in greater detail with reference to the accompanying drawings.

First Embodiment

In the following, a configuration and a processing flow of an encoding apparatus 10 and a decoding apparatus 20 according to a first embodiment of the present invention are sequentially described, and advantages of the first embodiment are also described.

Figure 1:
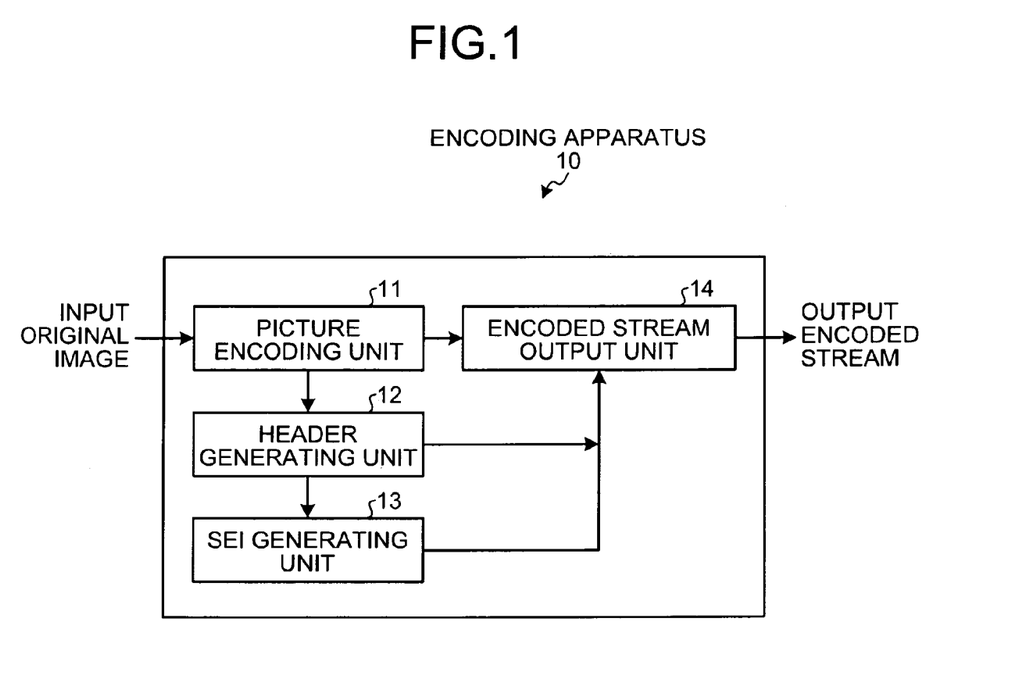
FIG. 1 is a block diagram of an encoding apparatus according to a first embodiment of the present invention.
Figure 2:
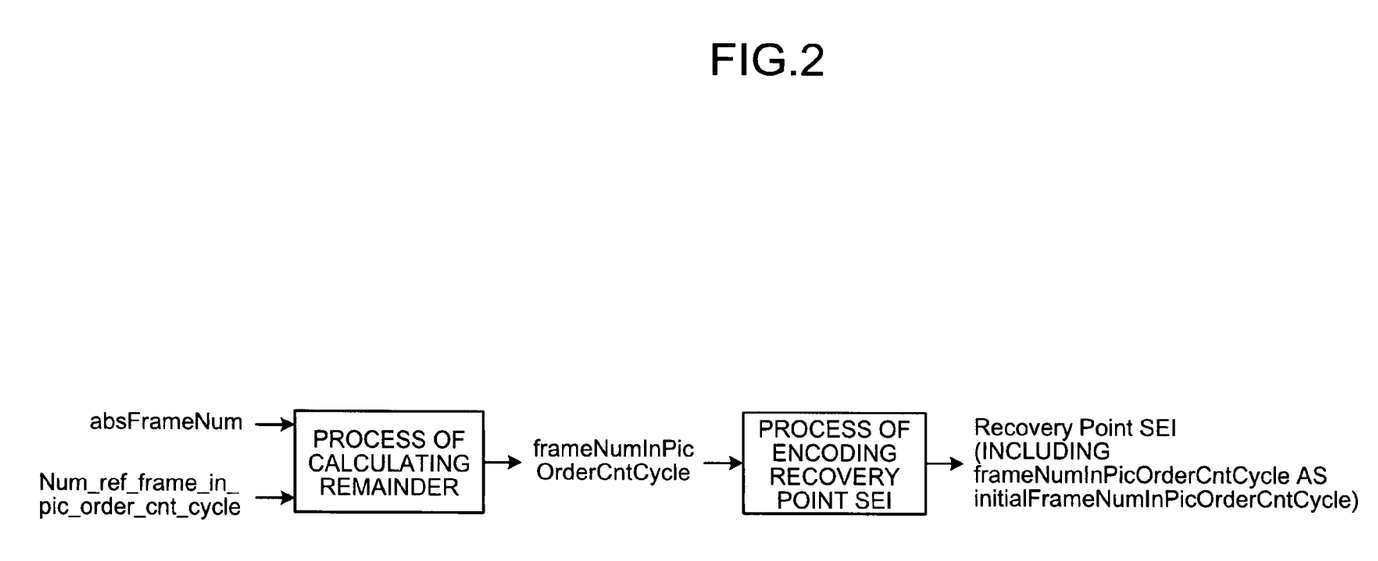
FIG. 2 is a schematic for explaining residual calculation and residual encoding.
Figure 3:
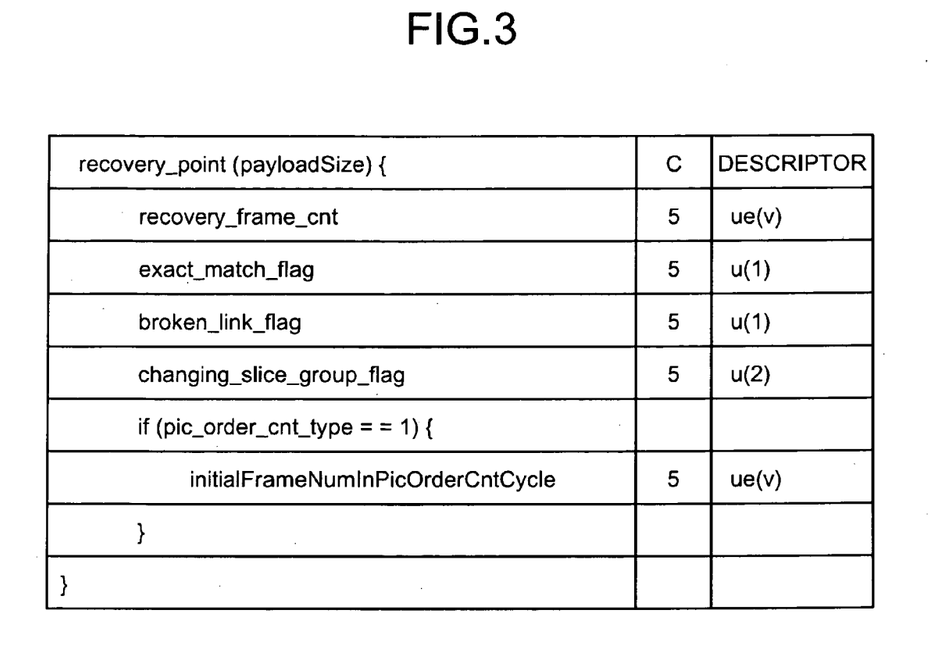
FIG. 3 is a schematic of an example of information added as recovery point SEI.

A configuration of the encoding apparatus 10 will now be explained with reference to FIGS. 1 to 3. FIG. 1 is a block diagram of the encoding apparatus 10 according to the first embodiment of the present invention. FIG. 2 is a schematic for explaining remainder calculation and remainder encoding. FIG. 3 is a schematic of an example of information added as recovery point supplemental enhancement information (SEI).

As depicted in FIG. 1, the encoding apparatus 10 includes a picture encoding unit 11, a header generating unit 12, an SEI generating unit 13, and an encoded stream output unit 14. The processing performed by each of the units will now be explained.

The picture encoding unit 11 encodes a picture based on H.264. More specifically, the picture encoding unit 11 receives original image information as an input, and performs an encoding process on the original image information. The picture encoding unit 11 sends a header information generation request to the header generating unit 12.

The header generating unit 12 generates header information defined in H.264. More specifically, the header generating unit 12, on receiving the header information generation request from the picture encoding unit 11, generates information related to POC, and generates header information that includes information related to the generated POC.

The SEI generating unit 13, by using information related to the POC, calculates a remainder, and generates recovery point SEI that includes information on the remainder. More specifically, the SEI generating unit 13 generates SEI that is supplemental enhancement information defined in H.264. The SEI generating unit 13 also generates recovery point SEI that is information related to a random start time (see FIG. 3, which will be described later).

The SEI generating unit 13, while generating a recovery point SEI, receives information related to the POC from the header generating unit 12. Using the received information, the SEI generating unit 13 calculates "frameNumInPicOrderCntCycle" that indicates a remainder used for decoding a value of the POC encoded by POC type 1. The SEI generating unit 13 enhances the recovery point SEI, and adds the frameNumInPicOrderCntCycle (remainder) thereto.

The processes of remainder calculation and remainder encoding will now be explained in detail with reference to FIG. 2. As depicted in FIG. 2, the SEI generating unit 13 divides absFrameNum−1, which is an absolute frame number calculated from an instantaneous decoding refresh (IDR) picture, by a divisor of num_ref_frames_in_pic_order_cnt_cycle that indicates the number of reference frames in one POC cycle set in advance, and calculates a remainder which is represented as frameNumInPicOrderCntCycle.

The SEI generating unit 13, as an encoding process of the recovery point SEI, encodes the calculated frameNumInPicOrderCntCycle (remainder), and adds to the recovery point SEI, as a syntax element called initialFrameNumInPicOrderCntCycle that has information amount of 8 bits (if encoded by Golomb coding, for example, information amount of 17 bits at maximum).

In a decoding process performed by the decoding apparatus 20 (described later), the POC of POC type 1 can be correctly calculated even during random access, if FrameNumOffset is initialized to the same value as the remainder, when the frameNumInPicOrderCntCycle is decoded from the IDR picture.

Accordingly, the encoding apparatus 10 adds to the recovery point SEI, a value of frameNumInPicOrderCntCycle at the generation of the recovery point SEI as a syntax element called initialFrameNumInPicOrderCntCycle that has information amount of 8 bits (for example, if encoded by Golomb coding, information amount of 17 bits at maximum). Then, the encoding apparatus 10 transmits the resulting information to the decoding apparatus 20.

An example of the recovery point SEI generated by the SEI generating unit 13 will now be explained with reference to FIG. 3. As depicted in FIG. 3, the SEI generating unit 13 adds the value of frameNumInPicOrderCntCycle (remainder) to the recovery point SEI, as a syntax element called initialFrameNumInPicOrderCntCycle that has information amount of 8 bits.

In the example of FIG. 3, if the POC is encoded according to the POC type 1 ("if (pic_order_cnt_type==1)" in FIG. 3), the decoding process is performed by using the initialFrameNumInPicOrderCntCycle. In FIG. 3, "5", in a "C" (category) column represents the SEI. Further, "u(n)" in a Descriptor column represents an n-bit unsigned integer syntax element, and "ue(v)" represents an unsigned integer Exp-Golomb-coded syntax element.

Referring back to FIG. 1, the encoded stream output unit 14 outputs an encoded stream. More specifically, the encoded stream output unit 14 outputs an encoded stream by adding the header information generated by the header generating unit 12 and the recovery point. SEI and the SEI generated by the SEI generating unit 13, to the information of picture encoded by the picture encoding unit 11.

Figure 4:
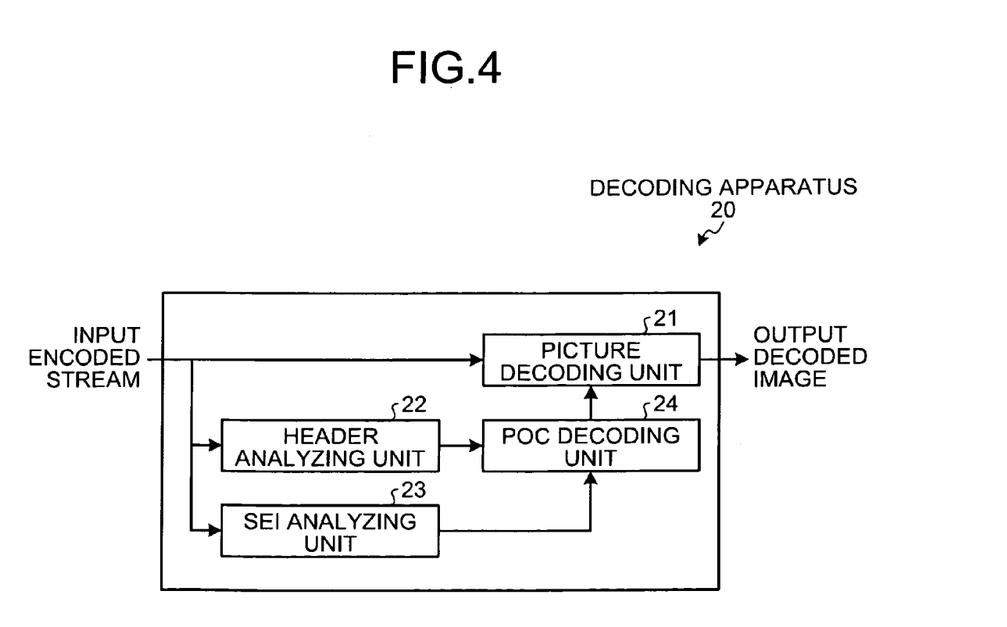
FIG. 4 is a block diagram of a decoding apparatus according to the first embodiment.
Figure 5:
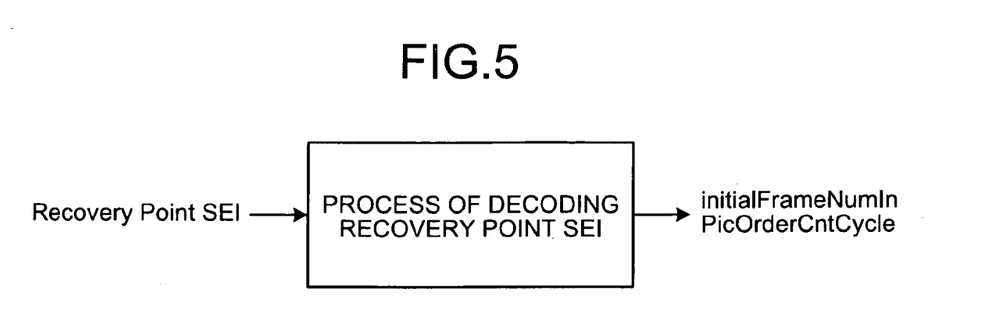
FIG. 5 is a schematic for explaining decoding of a residual.
Figure 6:
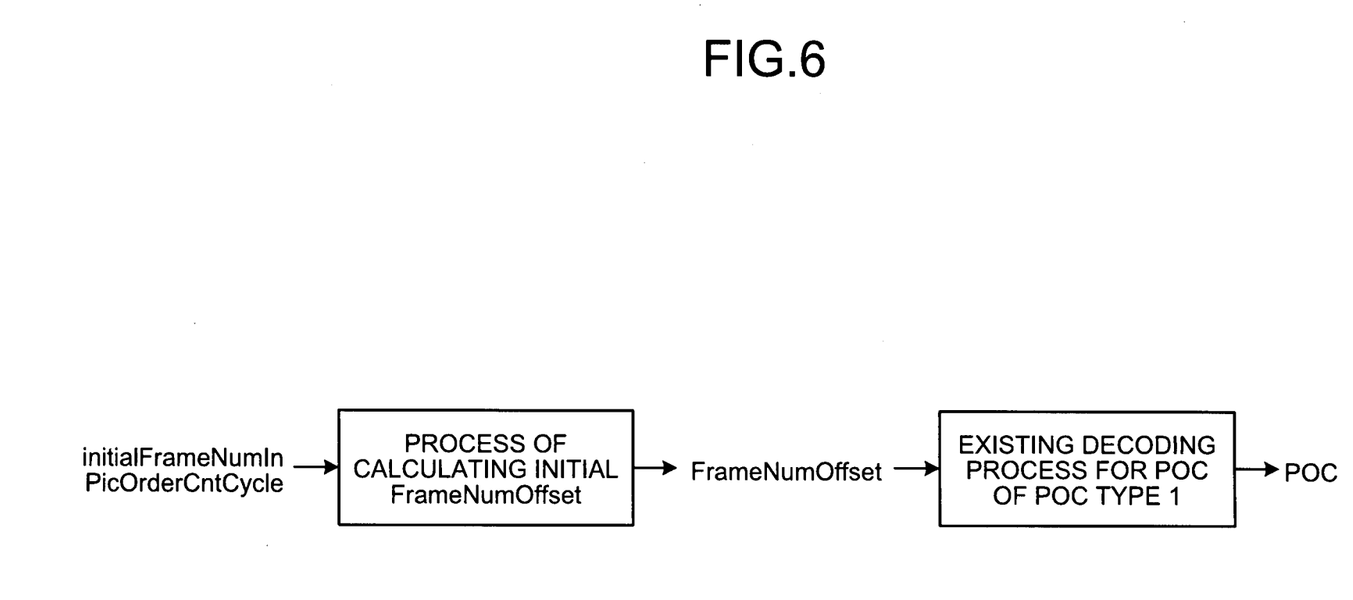
FIG. 6 is a schematic for explaining decoding of a POC using residual.
Figure 7:
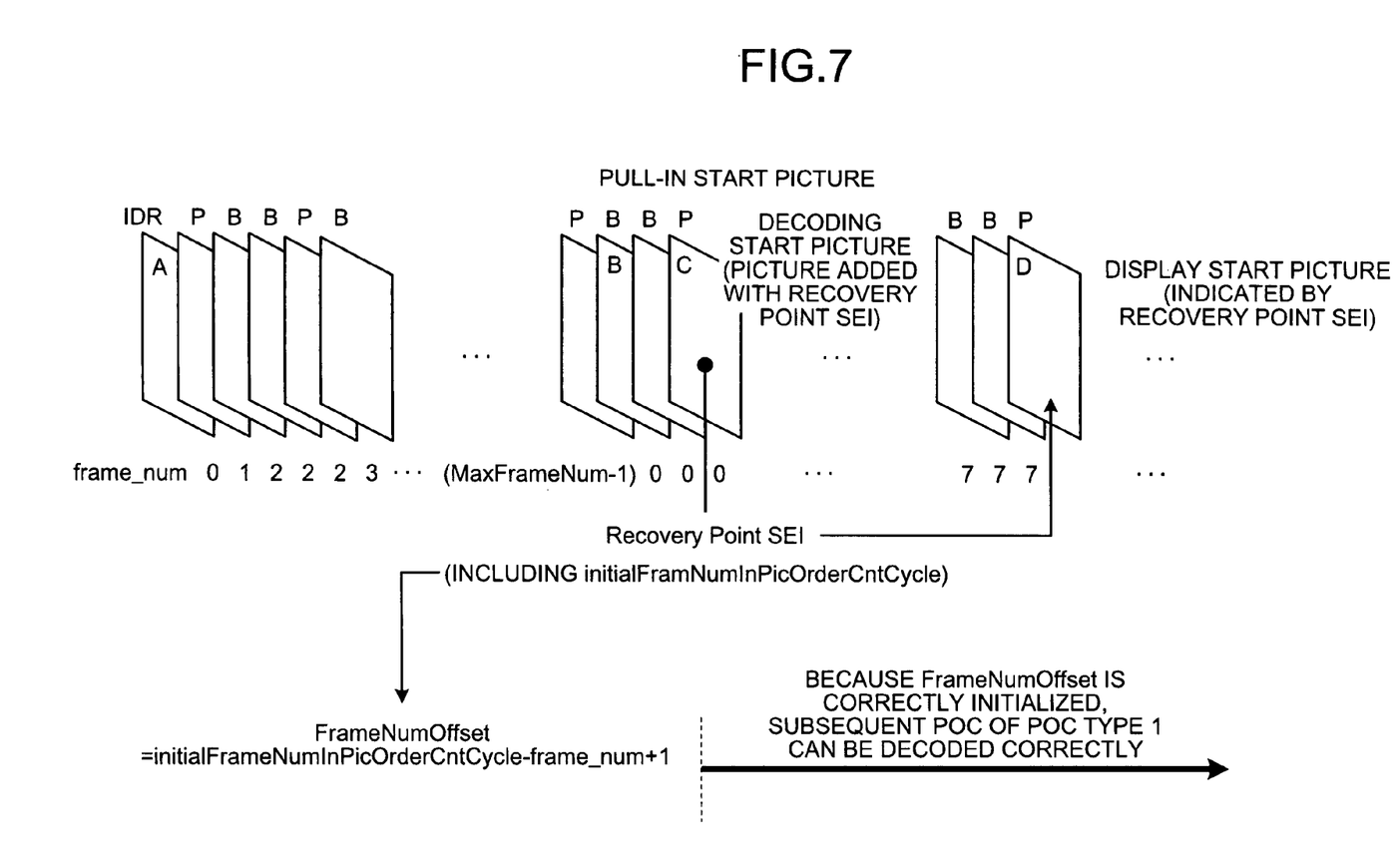
FIG. 7 is a schematic for specifically explaining a decoding process.

A configuration of the decoding apparatus 20 will now be explained with reference to FIGS. 4 to 7. FIG. 4 is a block diagram of the decoding apparatus 20 according to the first embodiment. FIG. 5 is a schematic for explaining decoding of a remainder. FIG. 6 is a schematic for explaining decoding of POC using the remainder. FIG. 7 is a schematic for specifically explaining a decoding process.

As depicted in FIG. 4, the decoding apparatus 20 includes a picture decoding unit 21, a header analyzing unit 22, an SEI analyzing unit 23, and a POC decoding unit 24. The processing performed by each of the units will now be explained.

The picture decoding unit 21 decodes a picture based on H.264. More specifically, the picture decoding unit 21 receives an encoded stream as an input, performs the decoding process on the encoded stream, and outputs decoded image information.

The header analyzing unit 22 analyzes the header information as specified in H.264. More specifically, the header analyzing unit 22, on receiving the input encoded stream, analyzes the header information, and extracts information related to the POC. The header analyzing unit 22 then sends information related to the POC to the POC decoding unit 24.

The SEI analyzing unit 23 analyzes SEI, which is supplemental information specified in H.264. More specifically, as depicted in FIG. 5, the SEI analyzing unit 23 decodes the first recovery point SEI after the random access, and extracts initialFrameNumInPicOrderCntCycle from the recovery point SEI. The SEI analyzing unit 23 then sends the extracted initialFrameNumInPicOrderCntCycle to the POC decoding unit 24.

The POC decoding unit 24, if it is the first recovery point SEI after the start of random access, performs the decoding process for the POC of POC type 1, by initializing the FrameNumOffset that is an input value of the decoding process for the POC of POC type 1, using the initialFrameNumInPicOrderCntCycle.

Before explaining an initializing process of the FrameNumOffset performed by the POC decoding unit 24, an existing decoding process for the POC of POC type 1, performed if it is not the first recovery point SEI after the start of random access will be explained (in other words, decoding process after the initializing process of the FrameNumOffset is performed). In the decoding process for the POC of POC type 1, the FrameNumOffset is initialized to 0, while the IDR picture is decoded. Then, a value of MaxFrameNum is added, every time it is frame_num<prev_frame_num (previous value of frame_num) (this process corresponds to (8-6) in the decoding process depicted in FIG. 12).

The frame_num is a relative number of a picture counted from the IDR, and counted again from 0, if 0=frame_num<MaxFrameNum (maximum value of frame_num) is satisfied, and if frame_num is equal to MaxFrameNum.

If nal_ref_idc is not 0, absFrameNum can be calculated based on the following formula (1), using the FrameNumOffset and the frame_num included in the encoded stream. If nal_ref_idc is equal to 0 (in other words, if it is B picture), absFrameNum can be calculated based on the following formula (2) which is obtained by subtracting 1 from a right side of the formula (1) as specified (this process corresponds to (8-7) in the decoding process depicted in FIG. 12).

$$absFrameNum = FrameNumOffset + frame\_num \quad (1)$$

$$absFrameNum = FrameNumOffset + frame\_num - 1 \quad (2)$$

The frameNumInPicOrderCntCycle can be calculated based on the following formula (3), by using the absFrameNum and the num_ref_frames_in_pic_order_cnt_cycle included in the encoded stream (this process corresponds to (8-8) in the decoding process depicted in FIG. 12).

$$frameNumInPicOrderCntCycle = (absFrameNum-1) \% num\_ref\_frames\_in\_pic\_order\_cnt\_cycle \quad (3)$$

Eventually, the value of POC is calculated by referring to a value from a list of offset_for_ref_frame [i] as many as the number of values of the frameNumInPicOrderCntCycle (this process corresponds to (8-10) in the decoding process depicted in FIG. 12).

Referring back to FIG. 4, a specific process of the POC decoding unit 24 will now be explained. The POC decoding unit 24 receives information related to the POC from the header analyzing unit 22, and receives initialFrameNumInPicOrderCntCycle from the SEI analyzing unit 23. The POC decoding unit 24 then determines whether the POC is encoded according to the POC type 1 based on the information related to the POC. If the POC is of the POC type 1, the POC decoding unit 24 determines whether the received recovery point SEI is the first recovery point SEI after the start of random access.

As a result, if it is the POC type 1 and the first recovery point SEI after the start of random access, the POC decoding unit 24 initializes the FrameNumOffset as described below and performs POC decoding process. This is enabled by using the information required for decoding the POC received from the header analyzing unit 22 and the initialFrameNumInPicOrderCntCycle received from the SEI analyzing unit 23. The POC decoding unit 24 performs the existing decoding process for the POC of POC type 1, if it is not the first recovery point SEI after the start of random access.

With reference to FIG. 6, a POC decoding process using a remainder performed by the POC decoding unit 24 will now be explained. As depicted in FIG. 6, if it is the first recovery point SEI after the start of random access, the POC decoding unit 24 initializes the FrameNumOffset, which is an input value of the decoding process for the POC of POC type 1, by using the initiaFrameNumInPicOrderCntCycle, based on the decoding process for the POC of POC type 1.

The relationship between the FrameNumOffset and the frameNumInPicOrderCntCycle is derived as formula (4) and formula (5), from the formula (1) and the formula (3). Then, formula (6) is derived from the formula (4) and the formula (5). However, if nal_ref_idc is equal to 0 (in other words, if it is B picture), formula (7) is derived by using the formula (2), instead of using the formula (1). The formula (2) is a formula from which 1 is subtracted from the formula (1) as specified. In the formula (5), the formula (6), and the formula (7), N is a nonnegative integer, and the upper limit value is a value which allows the value of TopFieldOrderCnt, BottomFieldOrderCnt, PicOrderCntMsb, or FrameNumOffset used for decoding process in FIG. 12, to fall in a range equal to or more than $-2^{31}$ as well as equal to or less than $2^{31}-1$.

$$FrameNumOffset = absFrameNum - frame\_num \quad (4)$$

$$absFrameNum = frameNumInPicOrderCntCycle + 1 + num\_ref\_frames\_in\_pic\_order\_cnt\_cycle*N \quad (5)$$

$$FrameNumOffset = frameNumInPicOrderCntCycle - frame\_num + 1 + num\_ref\_frames\_in\_pic\_order\_cnt\_cycle*N \quad (6)$$

$$FrameNumOffset = frameNumInPicOrderCntCycle - frame\_num + 2 + num\_ref\_frames\_in\_pic\_order\_cnt\_cycle*N \quad (7)$$

In other words, if it is the first recovery point SEI after the start of random access, and if nal_ref_idc is not 0, the POC decoding unit 24 initializes the FrameNumOffset, by using the value of initialFrameNumInPicOrderCntCycle as the frameNumInPicOrderCntCycle in the formula (6).

If it is the first recovery point SEI after the start of random access, but if nal_ref_idc is equal to 0, the POC decoding unit 24 initializes the FrameNumOffset, by using the value of initialFrameNumInPicOrderCntCycle as the frameNumInPicOrderCntCycle in the formula (7). The POC decoding unit 24 then outputs decoded image information, by performing the decoding process for the POC of POC type 1.

In other words, to correctly calculate the POC of POC type 1 during random access, the POC decoding unit 24 initializes the FrameNumOffset, so that the frameNumInPicOrderCntCycle is the same value as that when the frameNumInPicOrderCntCycle is decoded from the IDR picture.

With reference to FIG. 7, an example of the decoding process performed by the decoding apparatus 20 will now be explained. In FIG. 7, a picture "A" represents an IDR picture, a picture "B" represents a picture that is first input into a decoding apparatus during random access, a picture "C" represents a picture added with recovery point SEI, and a picture "D" represents a picture for which an existing syntax element of the recovery point SEI, recovery_frame_cnt indicates that the display thereof can be started.

The decoding apparatus 20 does not perform the decoding process with the picture that is present between the picture "B" that is first input into the decoding apparatus during random access and the picture "C" added with the recovery point SEI. This is because the picture does not have information to correctly decode the POC of POC type 1.

The decoding apparatus 20, when decoding the picture "C", initializes the FrameNumOffset, by using the initialFrameNumInPicOrderCntCycle that is an additional syntax element of the added recovery point SEI.

The decoding apparatus 20 then performs the decoding process for the POC, by using the initialized FrameNumOffset as an input value of the existing decoding process for the POC of POC type 1. Subsequently, because the FrameNumOffset is correctly initialized, the POC can be decoded as a value that corrects the display order of pictures, by performing the decoding process for the POC based on the existing decoding process for POC type 1. Accordingly, the pictures subsequent to the picture "D", from which the display can be started, are displayed in the correct order.

Figure 8:
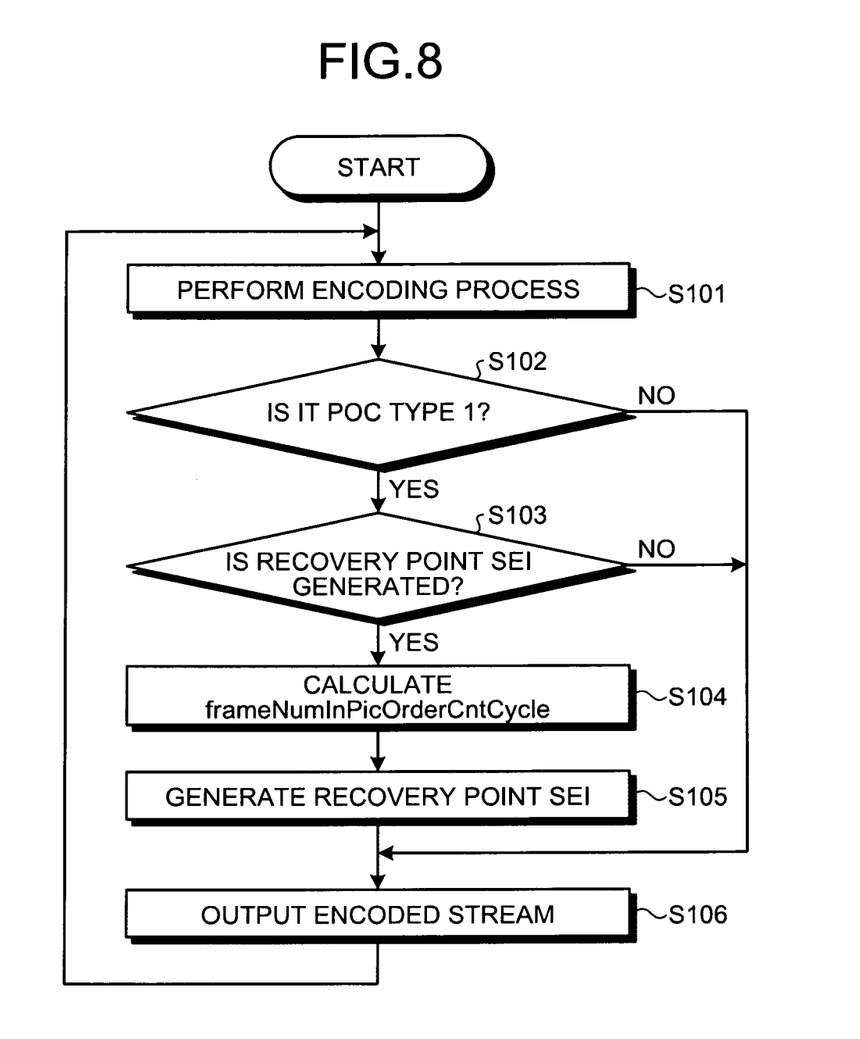
FIG. 8 is a flowchart of an operation performed by an encoding apparatus according to the first embodiment.

With reference to FIG. 8, a processing performed by the encoding apparatus 10 according to the first embodiment will now be explained. FIG. 8 is a flowchart illustrating an operation performed by the encoding apparatus 10 according to the first embodiment.

As depicted in FIG. 8, the encoding apparatus 10, after encoding the original image information (Step S101), determines whether it is the POC type 1 (Step S102). If it is the POC type 1 (Yes at Step S102), the encoding apparatus 10 determines whether to generate recovery point SEI (Step S103).

As a result, if the recovery point SEI is generated (Yes at Step S103), the encoding apparatus 10 calculates frameNumInPicOrderCntCycle using information related to the POC (Step S104).

The encoding apparatus 10 then enters the calculated value to the initialFrameNumInPicOrderCntCycle, which is a syntax element of the enhance recovery point SEI (Step S105), and outputs an encoded stream to the decoding apparatus 20 (Step S106).

The encoding apparatus 10, if it is not the POC type 1 (No at Step S102), or if the recovery point SEI is not generated (No at Step S103), outputs an encoded stream to the decoding apparatus 20 without generating the recovery point SEI (Step S106).

Figure 9:
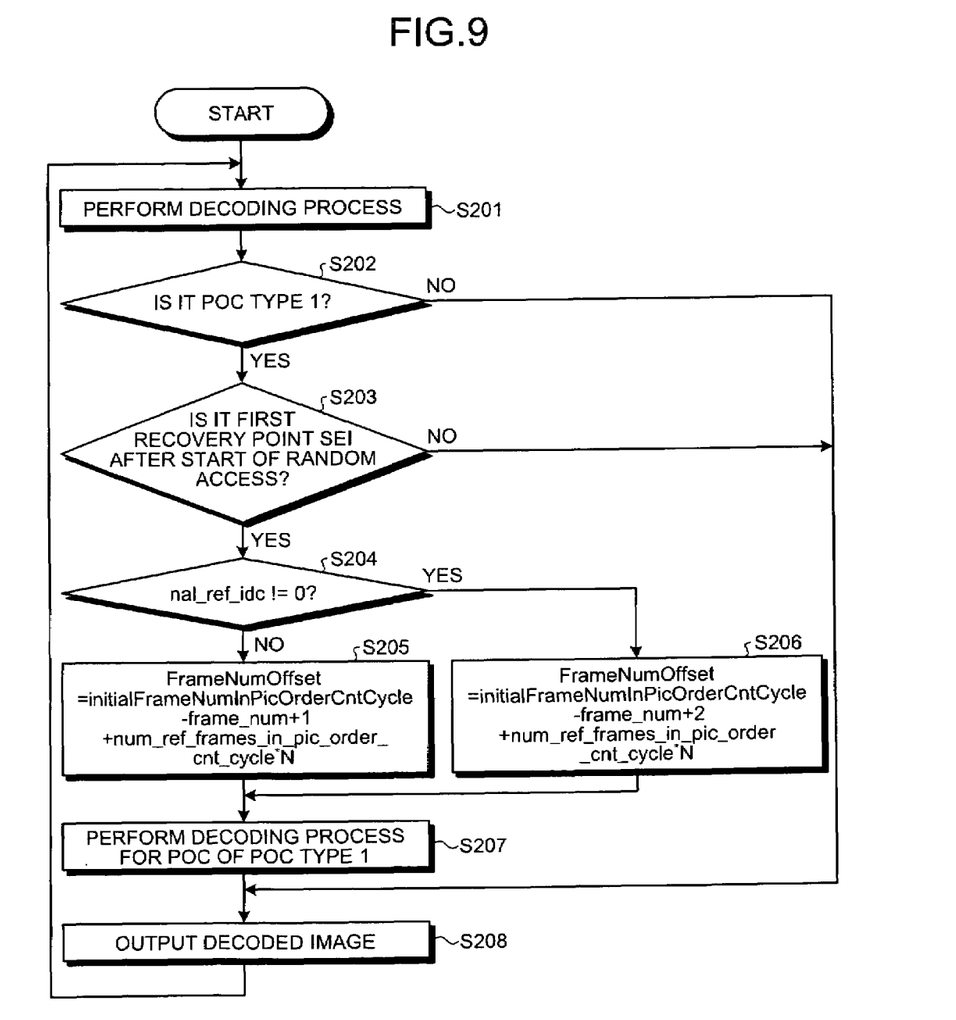
FIG. 9 is a flowchart of an operation performed by a decoding apparatus 20 according to the first embodiment.

With reference to FIG. 9, a processing performed by the decoding apparatus 20 according to the first embodiment will now be explained. FIG. 9 is a flowchart illustrates an operation performed by the decoding apparatus 20 according to the first embodiment.

As depicted in FIG. 9, the decoding apparatus 20, after decoding a picture (Step S201), determines whether it is the POC type 1 from the information related to the POC (Step S202). If it is the POC type 1 (Yes at Step S202), the decoding apparatus 20 determines whether it is the first recovery point SEI after the start of random access (Step S203).

As a result, if it is the POC type 1 and the first recovery point SEI after the start of random access (Yes at Step S203), the decoding apparatus 20 determines whether nal_ref_idc is 0 (Step S204). As a result, if nal_ref_idc is not 0 (No at Step S204), the decoding apparatus 20 initializes the FrameNumOffset, by using the value of initialFrameNumInPicOrderCntCycle to the frameNumInPicOrderCntCycle in the formula (6) (Step S205).

The decoding apparatus 20, if nal_ref_idc is 0 (Yes at Step S204), initializes the FrameNumOffset, by using the value of initialFrameNumInPicOrderCntCycle to the frameNumInPicOrderCntCycle in the formula (7) (Step S206). Then, the decoding apparatus 20 performs the decoding process for the POC of POC type 1 (Step S207), and outputs decoded image information (Step S208).

As described above, the encoding apparatus 10 can reduce the amount of information required for encoding, while correctly performing the decoding process during random access. This is enabled, because the encoding apparatus 10 calculates a remainder used for decoding the POC value encoded by the POC type 1 at the side of the encoding apparatus in advance, and transmits the value as a new syntax element of the recovery point SEI that is additional information used to allow random access in H.264/MPEG-4 AVC.

In other words, in H.264 decoding, the absolute value of the POC is not required, correct decoding may be realized if the relative value of the POC of each picture is correct. The encoding apparatus 10 does not transmit the POC value exactly the same as that when the POC of POC type 1 is decoded from the IDR picture during random access. Alternatively, the encoding apparatus 10 encodes and transmits the value of frameNumInPicOrderCntCycle as a new syntax element of the recovery point SEI to the decoding apparatus 20. The value of frameNumInPicOrderCntCycle is information that allows the value to be decoded, as a value that corrects the display order of pictures at the side of the decoding apparatus 20. Accordingly, it is possible to reduce the amount of information required for encoding transmitted by the encoding apparatus 10.

The decoding apparatus 20 can also set the relative value of the POC of each picture to exactly the same value as the value decoded from the IDR, in the decoded picture after the random access. This is enabled by appropriately initializing the POC decoding process, using the value of the frameNumInPicOrderCntCycle of the recovery point SEI.

According to the first embodiment, if it is a B picture, the decoding apparatus 20 initializes the FrameNumOffset by using a formula added with 1 as specified. Subsequently, it is possible to initialize the FrameNumOffset in conformity with H.264/MPEG-4 AVC.

Second Embodiment

While the embodiment of the present invention has been described, it is to be understood that various other modifications may be made to the present invention. The other embodiments included in the present invention will now be described as a second embodiment.

[b-1] System Configuration and the Like

The respective constituents of the illustrated apparatuses are functionally conceptual, and need not necessarily be physically configured as illustrated. In other words, the specific mode of dispersion and integration of each apparatus is not limited to the ones illustrated in the drawings, and all or a part thereof can be functionally or physically dispersed or integrated in an optional unit, depending on various kinds of load and the status of use. For example, the SEI generating unit 13 may be dispersed into a remainder calculating unit that calculates a remainder and a remainder code converting unit that encodes the remainder. All or an optional part of the respective processing functions carried out in each apparatus are realized by a central processing unit (CPU) and a computer program analyzed and executed by the CPU, or may be realized as hardware by the wired logic.

With each process described in the present embodiments, all or a part of the processes as being described as automatically performed may be manually performed, or all or a part of the processes described as being manually performed may be automatically performed with a known method. The information including the process procedure, the control procedure, specific names, and various kinds of data and parameter described in the specification or in the drawings can be optionally changed unless otherwise specified.

[b-2] Computer Program

Figure 10:
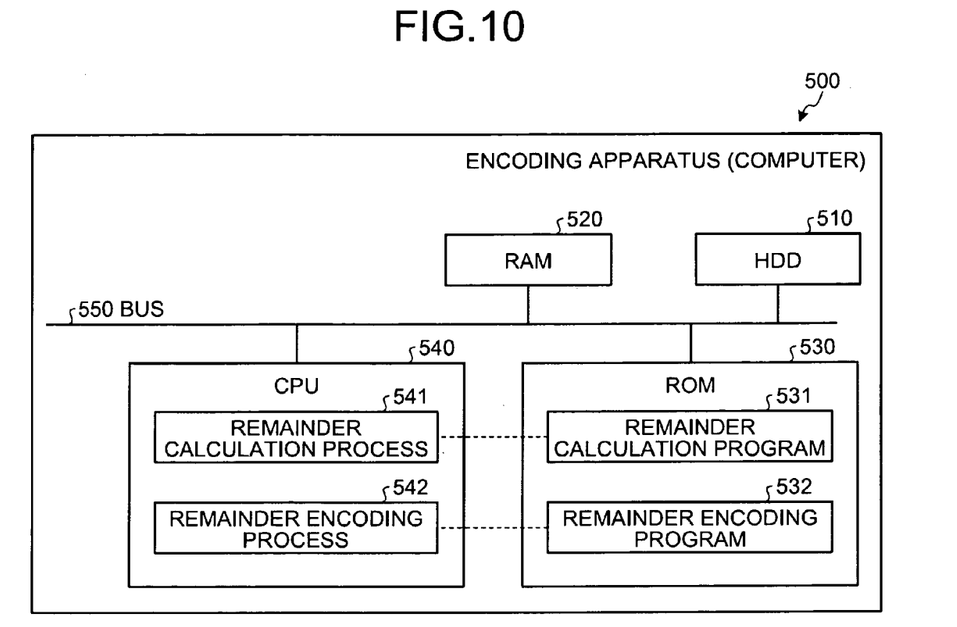
FIG. 10 is a schematic of a computer that executes an encoding program.

Various kinds of process described in the embodiments can be realized by executing a computer program prepared in advance using a computer. An example of a computer that executes a computer program having the similar function to that of the embodiments will now be explained, with reference to FIG. 10. FIG. 10 is a schematic of a computer that executes an encoding program.

As depicted in FIG. 10, a computer 500 as an encoding apparatus includes a hard disk drive (HDD) 510, a random access memory (RAM) 520, a read-only memory (ROM) 530, and a CPU 540 connected by a bus 550.

The ROM 530 stores therein an encoding program that exercises the similar function to that of the embodiments. In other words, as depicted in FIG. 10, the ROM 530 stores therein a residual calculation program 531 and a residual encoding program 532 in advance. The programs 531 and 532 may appropriately be integrated or dispersed, in a similar manner as the respective constituents of the encoding apparatus depicted in FIG. 1.

The CPU 540 reads out the programs 531 and 532 from the ROM 530 and executes. Accordingly, as depicted in FIG. 10, each of the programs 531 and 532 functions as a residual calculation process 541 and a residual encoding process 542. The processes 541 and 542 correspond to the SEI generating unit 13 depicted in FIG. 1.

Figure 11:
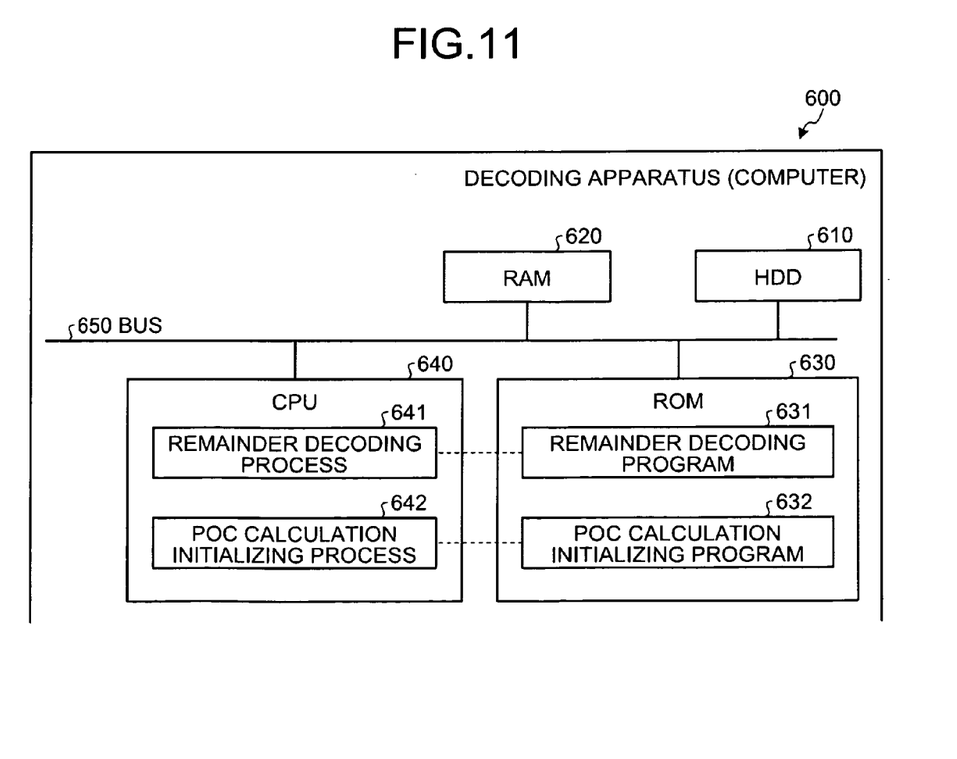
FIG. 11 is a schematic of a computer that executes a decoding program.

With reference to FIG. 11, an example of a computer that executes the computer programs that have the similar function to the embodiments will now be explained. FIG. 11 is a schematic of a computer that executes a decoding program.

As depicted in FIG. 11, a computer 600 as a decoding apparatus includes a HDD 610, a RAM 620, a ROM 630, and a CPU 640 connected by a bus 650.

The ROM 630 stores therein a decoding program that exercises the similar function to that of the embodiments. In other words, as depicted in FIG. 11, the ROM 630 stores therein a remainder decoding program 631 and a POC calculation initializing program 632 in advance. The programs 631 and 632 may appropriately be integrated or dispersed, in a similar manner to the respective constituents of the decoding apparatus depicted in FIG. 1.

The CPU 640 then reads out the programs 631 and 632 from the ROM 630, and executes. Accordingly, each of the programs 631 and 632 functions as a remainder decoding process 641 and a POC calculation initializing process 642 as depicted in FIG. 11. The processes 641 and 642 respectively correspond to the SEI analyzing unit 23 and the POC decoding unit 24 depicted in FIG. 4.

According to an embodiment, the remainder is included in the recovery point SEI as the information required for decoding. Accordingly, it is possible to advantageously reduce the amount of information required for encoding, while correctly performing decoding process during random access.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An encoding apparatus that encodes image data using a picture order count (POC) that indicates a display order of a picture, the encoding apparatus comprising:
   a remainder calculating unit that calculates a remainder by dividing an absolute frame number counted from an instantaneous decoding refresh (IDR) picture by a divisor which is a number of reference frames in one POC cycle;
   a remainder code converting unit that coverts the remainder calculated by the remainder calculating unit into a code
   a SEI generating unit that generates recovery point supplemental enhancement information (SEI) that is information related to a random start time;
   an adding unit that adds the remainder converted into the code by the remainder code converting unit to the recovery point SEI generated by the SEI generating unit; and
   a transmitting unit that transmits the recovery point SEI to which the remainder converted into the code by the remainder code converting unit is added, to a decoding apparatus.

2. The encoding apparatus according to claim 1, wherein a value of the POC is encoded by POC type 1 defined in H.264.

3. The encoding apparatus according to claim 1, wherein when nal_ref_idc defined in H.264 is not 0, the absolute frame number is calculated by adding a relative number of a picture counted from an instantaneous decoding refresh (IDR) to FrameNumOffset defined in H.264.

4. A decoding apparatus that decodes image data using a picture order count (POC) that indicates a display order of a picture, the decoding apparatus comprising:
   a receiving unit that receives a remainder code added to a picture at a random decoding start position;
   a remainder extracting unit that, when random access decoding is performed, extracts a remainder by decoding the remainder code, the remainder is obtained by dividing an absolute frame number counted from an instantaneous decoding refresh (IDR) picture by a divisor which is a number of reference frames in one POC cycle; and
   an initializing unit that initializes an input value of a decoding process for the POC, by using the remainder extracted by the remainder extracting unit,
   wherein the initializing unit initializes the input value of the decoding process for the POC, by using a subtraction value that is calculated by subtracting a number of pictures calculated from an instantaneous decoding refresh (IDR) picture, from the remainder.

5. The decoding apparatus according to claim 4, wherein the initializing unit, if a first picture input during random access is a B picture, initializes the input value of the decoding process for the POC, by using a value calculated by adding one to the subtraction value.

6. The decoding apparatus according to claim 4,
wherein a value of the POC is encoded by POC type 1 defined in H.264.

7. The decoding apparatus according to claim 4,
wherein when nal_ref_idc defined in H.264 is not 0, the absolute frame number is calculated by adding a relative number of a picture counted from an instantaneous decoding refresh (IDR) to FrameNumOffset defined in H.264.

8. An encoding method for encoding image data using a picture order count (POC) that indicates a display order of a picture, the encoding method comprising:
calculating, with a remainder calculating unit, a remainder by dividing an absolute frame number counted from an instantaneous decoding refresh (IDR) picture by a divisor which is a number of reference frames in one POC cycle; and
converting, with a remainder code converting unit, the remainder calculated in the calculating into a code
generating, with a SEI generating unit, recovery point supplemental enhancement information (SEI) that is information related to a random start time;
adding, with an adding unit, the remainder converted into the code at the converting to the recovery point SEI generated at the generating; and
transmitting, with a transmitting unit, the recovery point SEI to which the remainder converted into the code at the converting is added, to a decoding apparatus.

9. A decoding method for decoding image data using a picture order count (POC) that indicates a display order of a picture, the decoding method comprising:
receiving a remainder code added to a picture at a random decoding start position;
extracting with a remainder extracting unit, when random access decoding is performed, a remainder by decoding the remainder code added to a picture at a random decoding start position, the remainder is obtained by dividing an absolute frame number counted from an instantaneous decoding refresh (IDR) picture by a divisor which is a number of reference frames in one POC cycle; and
initializing, with an initializing unit, an input value of a decoding process for the POC, by using the remainder extracted in the extracting,
wherein the initializing includes initializing the input value of the decoding process for the POC, by using a subtraction value that is calculated by subtracting a number of pictures calculated from an instantaneous decoding refresh (IDR) picture, from the remainder.

10. The decoding apparatus according to claim 9, wherein the initializing includes, if a first picture input during random access is a B picture, initializing the input value of the decoding process for the POC, by using a value calculated by adding one to the subtraction value.

11. A non-transitory computer program product having a computer readable medium including programmed instructions for encoding image data using a picture order count (POC) that indicates a display order of a picture, wherein the instructions, when executed by a computer, cause the computer to perform:
calculating a remainder by dividing an absolute frame number counted from an instantaneous decoding refresh (IDR) picture by a divisor which is a number of reference frames in one POC cycle; and
converting the remainder calculated in the calculating into a code
generating recovery point supplemental enhancement information (SEI) that is information related to a random start time;
adding the remainder converted into the code at the converting to the recovery point SEI generated at the generating; and
transmitting the recovery point SEI to which the remainder converted into the code at the converting is added, to a decoding apparatus.

12. A non-transitory computer program product having a computer readable medium including programmed instructions for decoding image data using a picture order count (POC) that indicates a display order of a picture, wherein the instructions, when executed by a computer, cause the computer to perform:
receiving a remainder code added to a picture at a random decoding start position;
extracting, when random access decoding is performed, a remainder by decoding the remainder code added to a picture at a random decoding start position, the remainder is obtained by dividing an absolute frame number counted from an instantaneous decoding refresh (IDR) picture by a divisor which is a number of reference frames in one POC cycle; and
initializing an input value of a decoding process for the POC, by using the remainder extracted in the extracting, wherein
the initializing includes initializing the input value of the decoding process for the POC, by using a subtraction value that is calculated by subtracting a number of pictures calculated from an instantaneous decoding refresh (IDR) picture, from the remainder.

13. The computer program product according to claim 12, wherein the initializing includes, if a first picture input during random access is a B picture, initializing the input value of the decoding process for the POC, by using a value calculated by adding one to the subtraction value.

* * * * *